United States Patent
Sugahara

(10) Patent No.: US 9,211,666 B2
(45) Date of Patent: Dec. 15, 2015

(54) INJECTION MOLDING MACHINE CONTAINING TRANSFORMER

(71) Applicant: FANUC Corporation, Yamanashi (JP)

(72) Inventor: Keisuke Sugahara, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/513,510

(22) Filed: Oct. 14, 2014

(65) Prior Publication Data

US 2015/0104538 A1    Apr. 16, 2015

(30) Foreign Application Priority Data

Oct. 16, 2013    (JP) .................. 2013-215619

(51) Int. Cl.
  *B29C 45/17*  (2006.01)
  *B29C 45/64*  (2006.01)
  *B29C 45/03*  (2006.01)

(52) U.S. Cl.
  CPC .............. *B29C 45/17* (2013.01); *B29C 45/03* (2013.01); *B29C 45/64* (2013.01)

(58) Field of Classification Search
  CPC .................. B29C 45/17; B29C 45/64

USPC .................................... 425/143, 542
See application file for complete search history.

(56) References Cited

U.S. PATENT DOCUMENTS

2008/0193584 A1*  8/2008  Cooke ........................ 425/143

FOREIGN PATENT DOCUMENTS

| JP | S62-109922 U | 7/1987 |
| JP | 4-33471 U | 3/1992 |
| JP | 2003-291174 A | 10/2003 |
| JP | 2010-12720 A | 1/2010 |

OTHER PUBLICATIONS

Cincinnati Milicron pamphlet, Electronic Digital Set Machines, published Oct. 1984.*
Office Action mailed Nov. 25, 2014, corresponding to Japanese patent application No. 2013-215619.

* cited by examiner

*Primary Examiner* — Tim Heitbrink
(74) *Attorney, Agent, or Firm* — Hauptman Ham, LLP

(57) ABSTRACT

An injection unit and mold clamping unit are placed on a machine base of an injection molding machine. On the other hand, a transformer used to convert a voltage supplied from an external power source to a voltage necessary for the injection molding machine is placed in the machine base under the mold clamping unit.

3 Claims, 6 Drawing Sheets

INJECTION MOLDING MACHINE CONTAINING TRANSFORMER

RELATED APPLICATIONS

The present application claims priority to Japanese Application Number 2013-215619, filed Oct. 16, 2013, the disclosure of which is hereby incorporated by reference herein in its entirety.

BACKGROUND OF THE INVENTION

1. Field of the Invention

The present invention relates to an injection molding machine, and more particularly, to an injection molding machine containing a transformer.

2. Description of the Related Art

An injection molding machine needs electric power to drive an internal motor and a drive unit which drives the motor and the electric power is supplied from an external power source. In this case, if a voltage necessary for the injection molding machine is different from a voltage supplied from the external power source, a transformer is required in order to convert the voltage supplied from the external power source to the voltage necessary for the injection molding machine, and conventionally the transformer is installed separately from the injection molding machine.

In general, the injection molding machine is placed on a machine base, but when the machine base supports an injection unit or mold clamping unit of the injection molding machine, columns are often used for the support, often leaving a lot of space in the machine base.

Regarding utilization of space in the machine base of the injection molding machine, Japanese Utility Model Application Laid-Open No. 62-109922 discloses a technique for integrally incorporating a mold temperature control unit into an injection molding machine body.

When a transformer is installed separately from the injection molding machine, a great deal of space might be required in order to install the transformer. Furthermore, when the transformer is installed outside, the operation of interconnecting the injection molding machine to the transformer by a cable is necessary, which might complicate operator's operation.

Moreover, although Japanese Utility Model Application Laid-Open No. 62-109922, mentioned above, discloses a technique for integrally incorporating the mold temperature control unit into the machine base of the injection molding machine, the transformer used for injection molding machines is generally quite heavy and differs greatly from the mold temperature control units in weight and the like.

SUMMARY OF THE INVENTION

Thus, an object of the present invention is to provide an injection molding machine including a transformer and easy to handle.

An injection molding machine according to the present invention includes: a machine base; an injection unit; a mold clamping unit; and a transformer, wherein the injection unit and the mold clamping unit are placed on the machine base, and the transformer is placed in the machine base under the mold clamping unit.

The machine base may include an upper frame, a lower frame, and columns adapted to support the upper frame on the lower frame, the lower frame may include a plurality of longitudinal members arranged along a longitudinal direction of the injection molding machine, and a transverse member adapted to couple together the longitudinal members, and the transformer may be supported at least by the longitudinal members or by the transverse member.

According to this embodiment, the transformer is supported at least by a plurality of longitudinal members arranged along the longitudinal direction of the injection molding machine or by the transverse member adapted to couple together the longitudinal members and/or the transformer base and the reinforcement member are provided. It is thereby possible to prevent deformation and the like of the injection molding machine even if the transformer heavy in weight is placed in the injection molding machine.

The transformer may be fixed to the machine base in a state where the transformer is mounted on a transformer base.

A reinforcement member may be attached securely to the machine base, and the transformer or the transformer base on which the transformer is mounted may be supported by the reinforcement member.

Peripheries of the transformer placed in the machine base may be covered with a plurality of covers.

According to this embodiment, the peripheries of the transformer are covered with a plurality of covers so as to prevent direct contact with the transformer. It is thereby possible to work safely during machine operation after the injection molding machine is connected with a power source.

The covers may support the upper frame.

According to this embodiment, the covers which cover the peripheries of the transformer support the upper frame to assume a role of the columns. It is thereby possible to reduce the number of columns as well as the number of covers used to cover the peripheries of the transformer.

A space between the columns may be used as a passage for transporting the transformer or the transformer base on which the transformer is mounted from an outside of the machine base into the machine base.

Having the configuration described above, the present invention makes the injection molding machine including the transformer easy to handle.

BRIEF DESCRIPTION OF THE DRAWINGS

The above and other objects and features of the present invention will become more apparent from the following description of the embodiments taken in conjunction with the accompanying drawings, wherein.

DETAILED DESCRIPTION OF THE PREFERRED EMBODIMENTS

Figure 1:
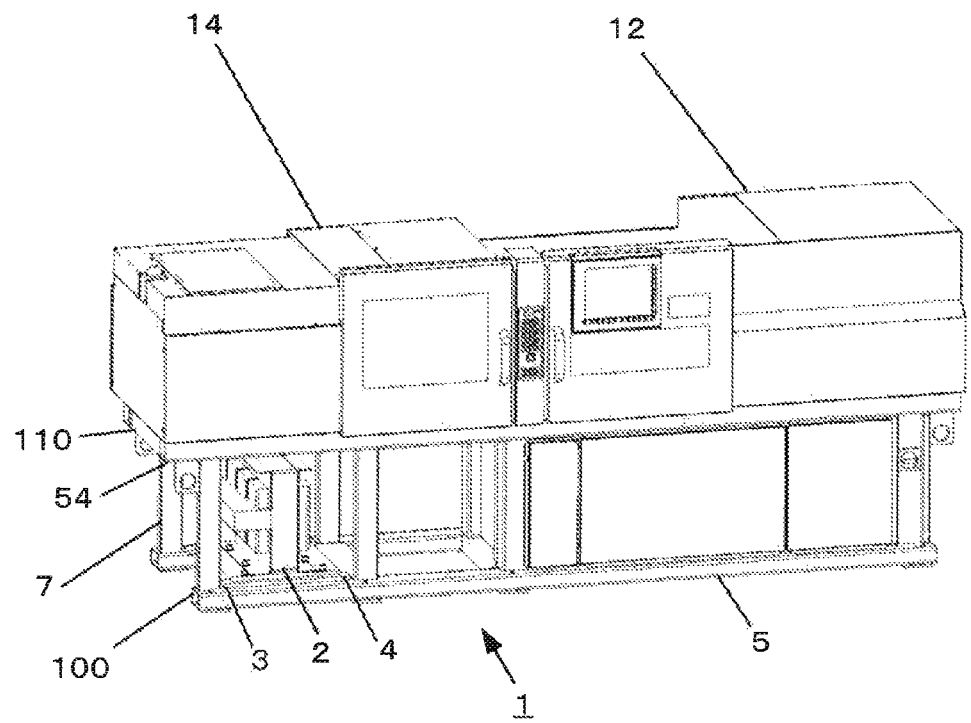
FIG. 1 is a diagram showing a first embodiment of an injection molding machine according to the present invention.

To begin with, a first embodiment of an injection molding machine according to the present invention will be described with reference to FIGS. 1 to 6. As shown in FIG. 1, an injection unit 12 and a mold clamping unit 14 are placed in a longitudinal direction on a machine base 1. The machine base 1 is a rectangular parallelepiped structure made up of a lower frame 100 and an upper frame 110 as well as plural columns 7 adapted to join together the lower frame 100 and upper frame 110. The lower frame 100 includes a pair of longitudinal members 5 extending in a horizontal direction in FIGS. 1 and 2 and plural transverse members 52 adapted to join together the longitudinal members 5 by extending in a direction perpendicular to the longitudinal members 5. Likewise, the upper frame 110 includes a pair of longitudinal members 54 extending in the horizontal direction in FIGS. 1 and 2 and plural transverse members (not shown) adapted to join together the longitudinal members 54 by extending in the direction perpendicular to the longitudinal members 54.

Figure 2:
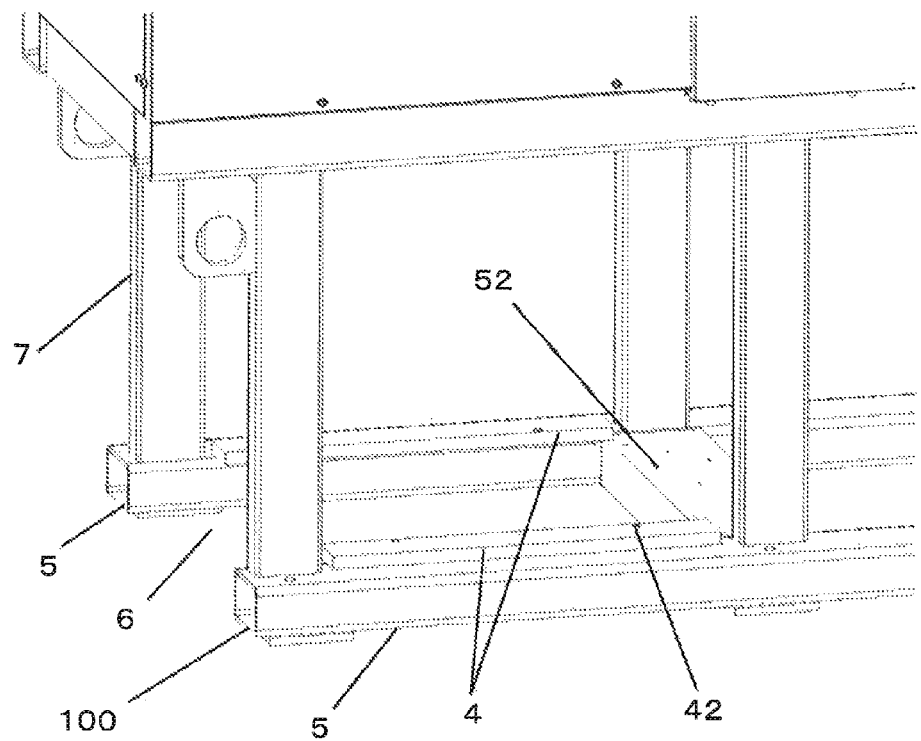
FIG. 2 is an enlarged view showing a structure of a machine base of the injection molding machine of FIG. 1 without any transformer placed in the machine base.

As shown in FIG. 2, reinforcement members 4, on which a transformer base 3 with a transformer 2 mounted thereon (described later) is to be mounted, are securely attached to top surfaces of the longitudinal members 5 of the lower frame 100. Screw holes 42 for use to fix the transformer base 3 are provided in the reinforcement members 4. The reinforcement members 4 are constructed from flat steel just thick enough to inhibit deformation of the machine base 1 when the transformer 2 is mounted.

FIG. 1 shows how the transformer 2 is placed in the machine base 1 of a rectangular parallelepiped structure.

The transformer 2 is mounted on the transformer base 3, and the transformer 2 mounted on the transformer base 3 is then placed on the reinforcement members 4 and housed between the columns 7 (an inter-column space 8 shown in FIG. 4) under the mold clamping unit 14. The transformer base 3 is provided with holes or notches (not shown), and screws inserted in the holes or notches are threadedly engaged with the screw holes 42 (FIG. 2) provided in the reinforcement members 4, thereby fixing the transformer base 3 (with the transformer 2 mounted thereon) to the reinforcement members 4.

Figure 3:
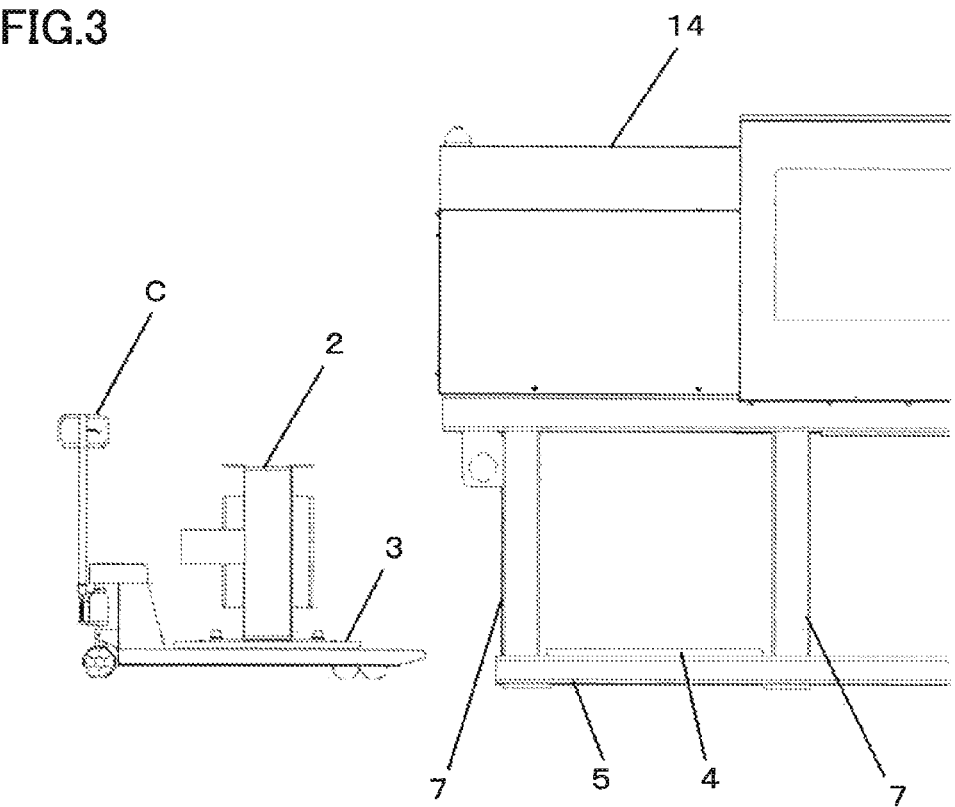
FIG. 3 is a diagram showing a transport method used to transport the transformer to the machine base of the injection molding machine of FIG. 1.

FIG. 3 is a diagram showing a method for transporting the transformer 2 into the machine base 1 of the injection molding machine.

As shown in FIG. 3, the transformer 2 mounted on the transformer base 3 is put on a hand carry C, and then as shown in FIG. 2, the transformer 2 mounted on the transformer base 3 is transferred into the machine base 1 of the injection molding machine through an opening 6 (see FIG. 2) formed between the columns 7 placed between respective edges of the pair of longitudinal members 5 making up the lower frame 100 and respective edges of the pair of longitudinal members 5 making up the upper frame 110. Before the transfer, the hand carry C is adjusted in height such that the transformer base 3 put on the hand carry C will be level with the reinforcement members 4 fixed to upper parts of the pair of longitudinal members 5 making up the lower frame 100. As a result, this makes it possible to smoothly transfer the transformer 2 mounted on the transformer base 3 from the hand carry C into the machine base 1 of the injection molding machine.

Figure 4:
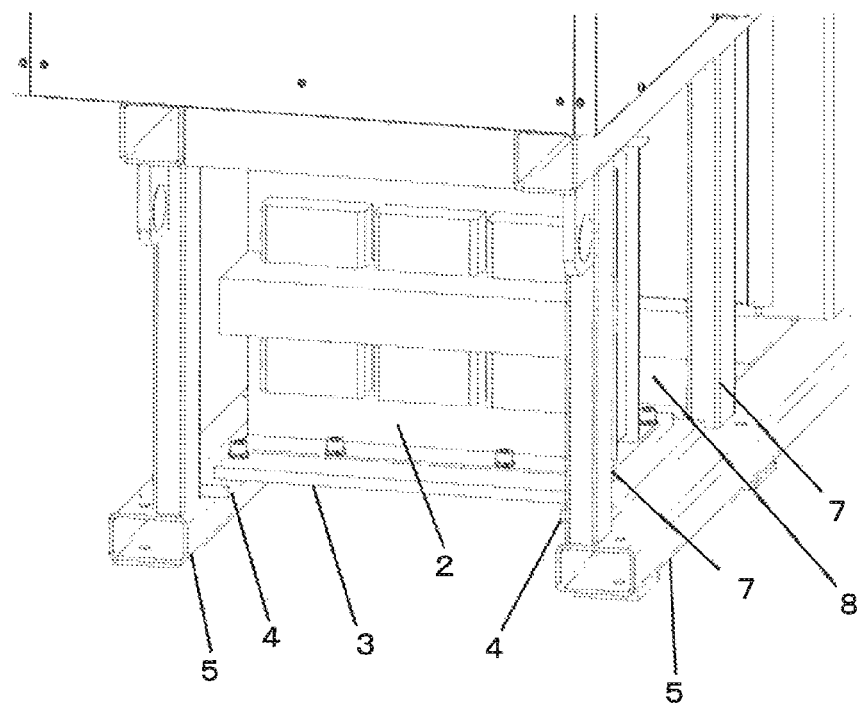
FIG. 4 is an enlarged view showing the machine base of the injection molding machine of FIG. 1 as viewed from the side of an opening between columns, through which the transformer is transported to the machine base.

Furthermore, as shown in FIG. 4, the respective inner ends of the reinforcement members 4, in the width direction, fixed to the pair of longitudinal members 5 making up the lower frame 100 are configured to protrude inward of the pair of columns 7 that define the opening 6 shown in FIG. 2 (i.e., toward the opening 6). Consequently, when the transformer 2 mounted on the transformer base 3 is transported by the hand carry C, the transformer 2 mounted on the transformer base 3 can be transferred smoothly from the hand carry C onto the reinforcement members 4.

Moreover, not only during carry-in of the transformer 2 mounted on the transformer base 3, but also during maintenance of the transformer 2, the transformer 2 mounted on the transformer base 3 can be similarly pulled out and replaced using the hand carry C. The transformer 2 normally weighs 100 kilograms or more and is generally difficult to lift unless a crane or the like is used. When the mold clamping unit 14 is installed on top of the machine base 1 as with the injection molding machine according to the present invention, it is difficult to place the transformer 2 in the machine base 1 of the injection molding machine using a crane, but if the transformer 2 is transferred into the machine base 1 of the injection molding machine through the opening 6 (FIG. 2) formed between the columns provided on flanks of the machine base 1 as with the present embodiment, the transformer 2 can be transferred using a hand carry or forklift.

Figure 5:
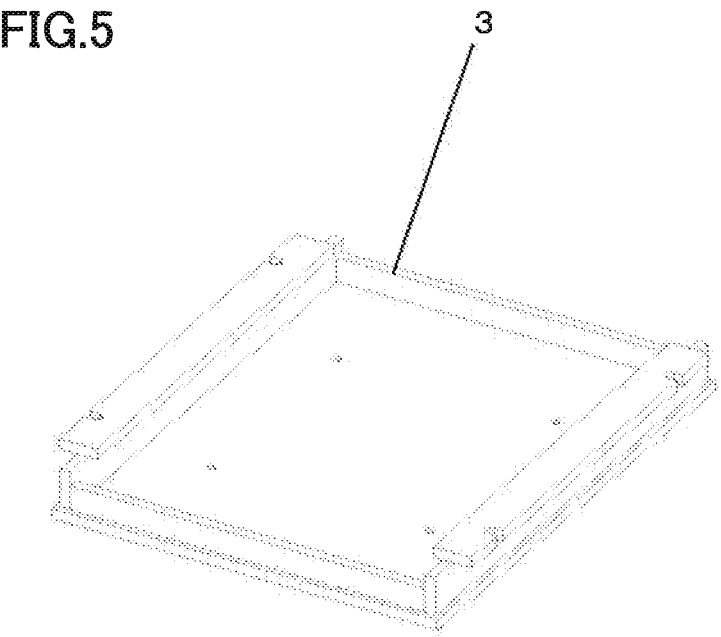
FIG. 5 is a diagram showing one form of a structure of a transformer base on which the transformer is mounted.

Although a pipe material is used for the columns 7 which join together the lower frame 100 and upper frame 110 in the present embodiment, other structural steel beams such as I-beams, C-beams, or H-beams may be used alternatively. Furthermore, although a single flat steel bar is used as the transformer base 3 in the present embodiment, a plurality of welded flat steel bars may be used as shown in FIG. 5 to deal with cases in which the transformer 2 has a large overall height.

While the present embodiment shows a structure in which the transformer 2 mounted on the transformer base 3 is supported by (the reinforcement members 4 fixed, respectively, to) the pair of longitudinal members 5 making up the lower frame 100, the transformer 2 mounted on the transformer base 3 may be supported by (the reinforcement members 4 fixed, respectively, to) the transverse members 52 making up the lower frame 100 or supported by both the longitudinal members 5 and transverse members 52 making up the lower frame 100.

The transformer 2 mounted on the transformer base 3 may be used in an exposed state in the machine base 1 of the injection molding machine as shown in FIG. 1. However, in order to increase operational safety of the injection molding machine after the injection molding machine is connected with a power source, the space between the columns 7 is preferably covered with safety covers 10 as shown in FIG. 6.

Figure 6:
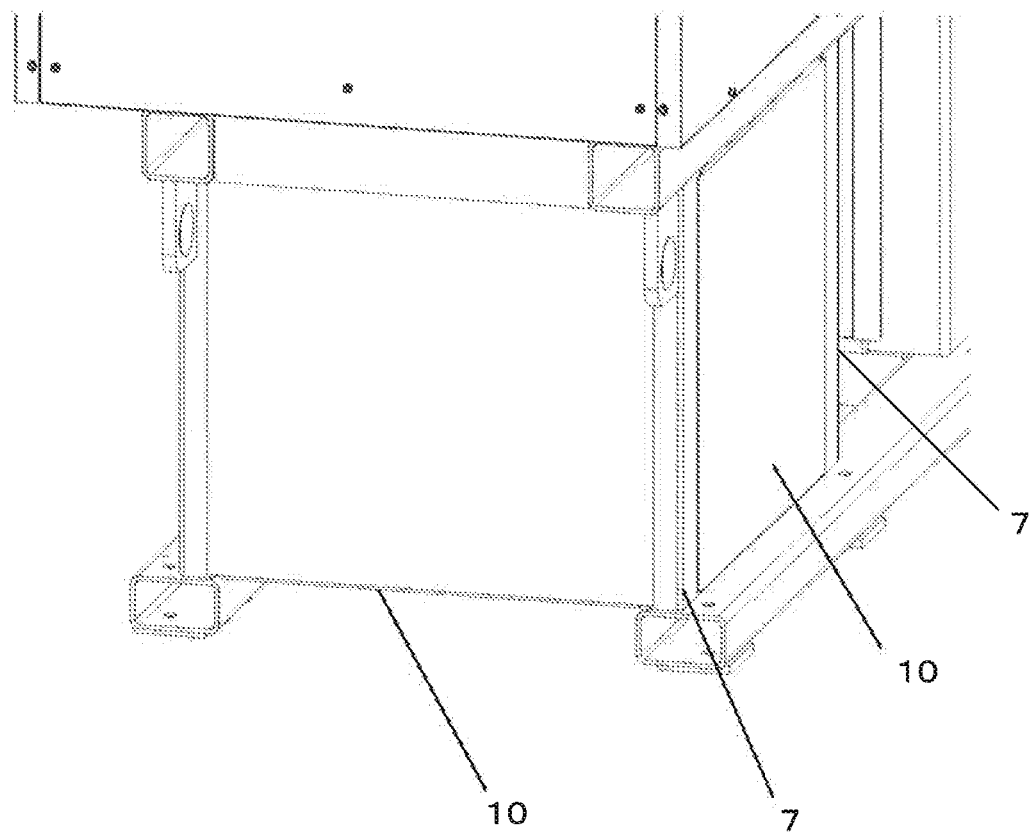
FIG. 6 is a diagram showing how peripheries of the transformer fixed to the machine base of FIG. 4 are covered with covers.

In FIG. 6, peripheries of the transformer 2 placed in the machine base 1 of the injection molding machine are covered with the plural covers 10 spanning the transverse members making up the upper frame 110 of the machine base 1, the reinforcement members 4, and the columns 7. Preferably, all the peripheries (a total of six surfaces: top and bottom surfaces, right and left surfaces, and front and rear surfaces) of the transformer 2 are covered with these covers 10. The shape formed by these covers is not limited to a cube, and may be cylindrical or other shape.

Figure 7:
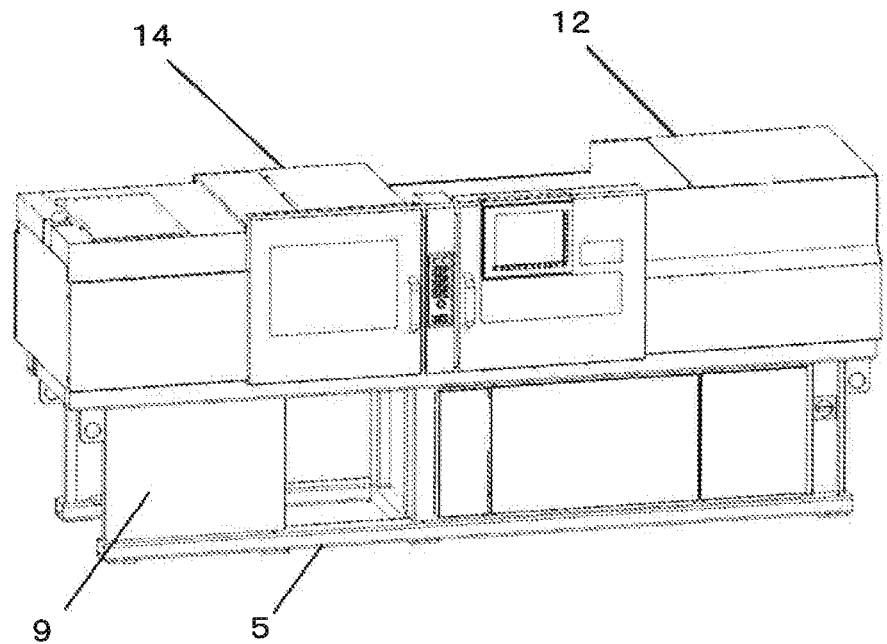
FIG. 7 is a diagram showing a second embodiment of the injection molding machine according to the present invention.

Next, a second embodiment of the injection molding machine according to the present invention will be described with reference to FIGS. 7 and 8.

The second embodiment differs from the first embodiment in that columns 9 made of a plate material are used as columns to couple together the lower frame 100 and upper frame 110 whereas the pipe material is used for the columns in the first embodiment.

Figure 8:
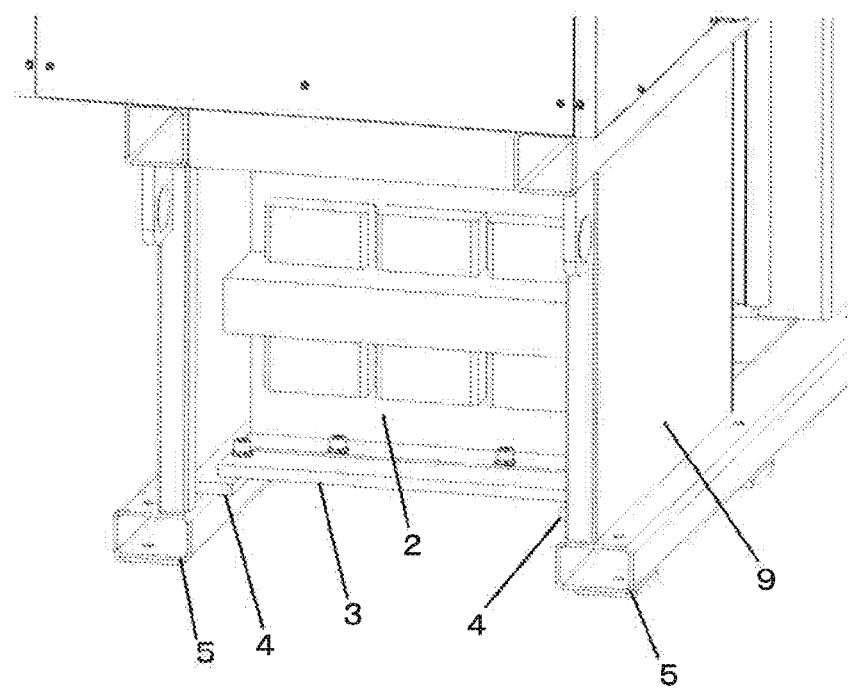
FIG. 8 is an enlarged view showing the machine base of the injection molding machine of FIG. 7 as viewed from the side of an opening, through which the transformer is transported to the machine base.

While an inter-column space 8 shown in FIG. 4 is formed between the columns 7 under the mold clamping unit 14 as shown in FIGS. 2 and 4 in the first embodiment, the columns used in the second embodiment are the plate columns 9 made of lip channel steel formed by bending the plate material as shown in FIG. 8. By placing the plate columns 9 farther away from the transformer 2 than the reinforcement members 4 fixed to the longitudinal members 5 making up the lower frame 100, an area corresponding to the inter-column space 8 according to the first embodiment is covered with the plate columns 9. The plate columns 9 can inhibit the longitudinal members 5 from deforming toward the transformer 2 even if the heavy transformer 2 is placed in the machine base 1 of the injection molding machine.

Furthermore, the hand carry C shown in FIG. 3 is used to transfer the transformer 2 mounted on the transformer base 3 into the machine base 1 (into a space covered with the plate columns 9) of the injection molding machine as with the first embodiment.

Figure 9:
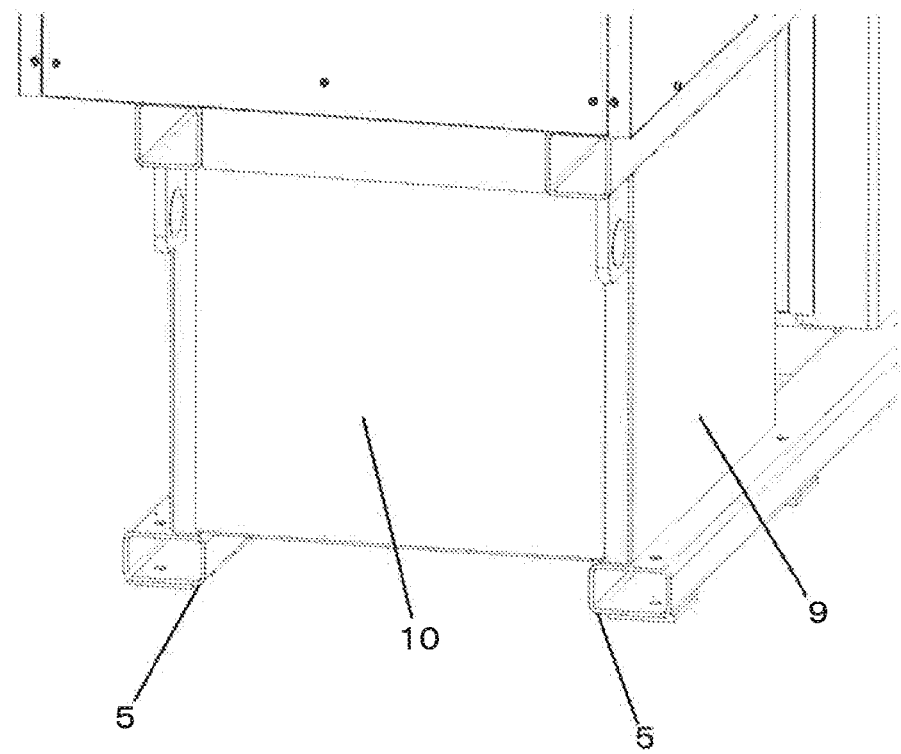
FIG. 9 is a diagram showing how peripheries of the transformer fixed to the machine base of FIG. 8 are covered with covers.

The transformer 2 mounted on the transformer base 3 may be used in an exposed state in the machine base 1 of the injection molding machine as shown in FIG. 8. However, in order to increase operational safety of the injection molding machine after the injection molding machine is connected with a power source, gaps that are not covered with the plate columns 9 on the peripheries of the transformer 2 are preferably covered with the safety covers 10 as shown in FIG. 9, covering all the peripheries of the transformer 2 with the covers. In FIG. 9, since the plate columns 9 also function as the safety covers, it is possible to reduce the number of cover parts compared to the first embodiment in covering all the peripheries (a total of six surfaces: top and bottom surfaces, right and left surfaces, and front and rear surfaces) of the transformer 2 with the plural covers 10 spanning the transverse members (not shown) making up the upper frame 110 of the machine base 1, the reinforcement members 4, and the plate columns 9.

Figure 10:
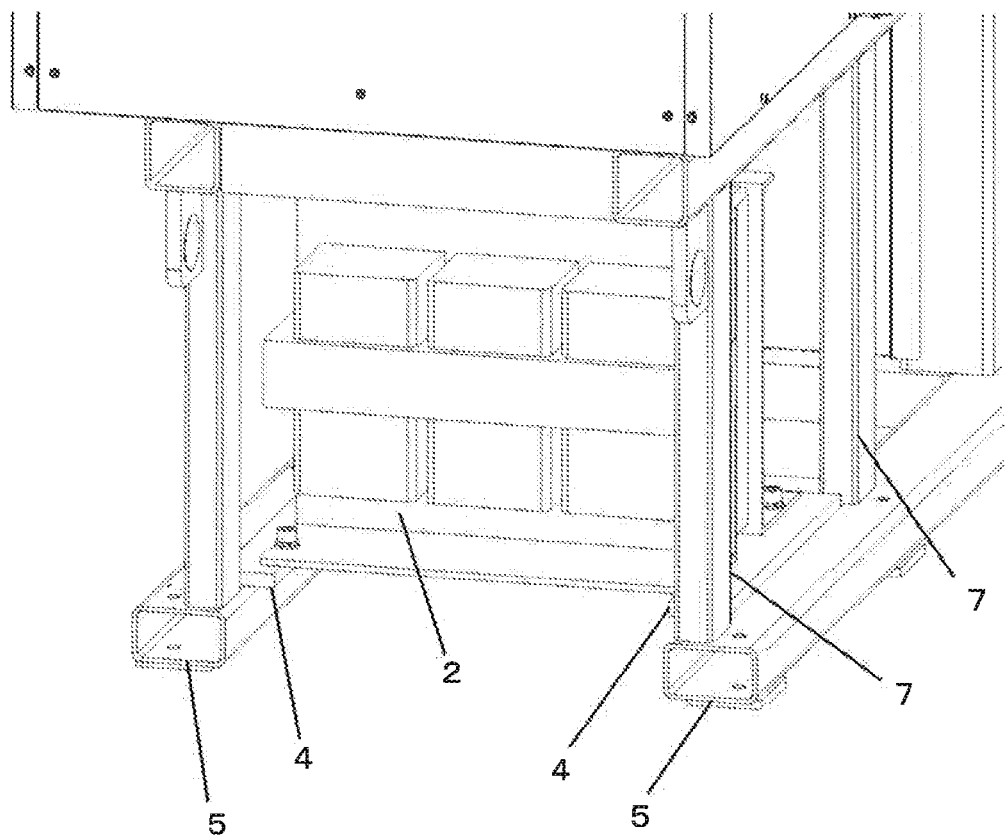
FIG. 10 is a diagram showing a third embodiment of the injection molding machine according to the present invention.

Next, a third embodiment of the injection molding machine according to the present invention will be described with reference to FIG. 10.

In the first embodiment described above, the transformer 2 is placed in the machine base 1 of the injection molding machine after being put on the transformer base 3. In the third embodiment, the transformer 2 is placed in the machine base 1 of the injection molding machine (without being put on the transformer base 3). Therefore, in the present embodiment, holes (not shown) are provided in the bottom of the transformer 2 and screws inserted into the holes are threadedly engaged with the screw holes 42 (FIG. 2) provided in the reinforcement members 4, thereby fixing the transformer 2 directly to the reinforcement members 4.

Figure 11:
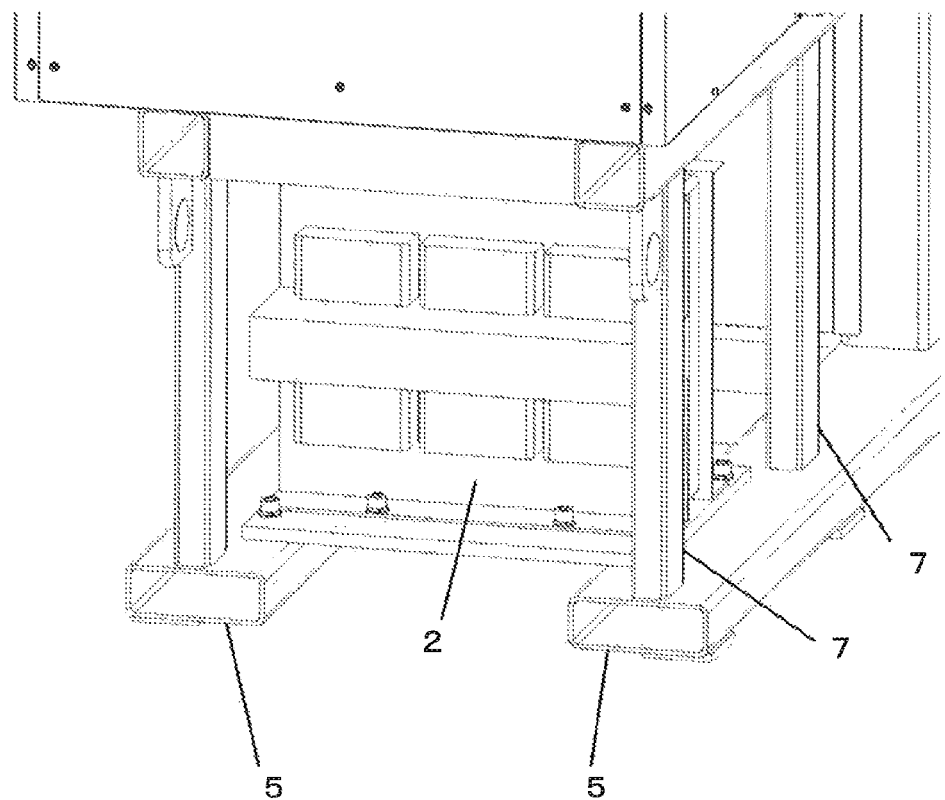
FIG. 11 is a diagram showing a fourth embodiment of the injection molding machine according to the present invention.

Next, a fourth embodiment of the injection molding machine according to the present invention will be described with reference to FIG. 11.

In the first embodiment described above, the reinforcement members 4 are fixed to the longitudinal members 5 of the lower frame 100, and the transformer base 3 on which the transformer 2 is mounted is fixed to the reinforcement members. In the fourth embodiment, the transformer base 3 on which the transformer 2 is mounted is fixed directly to the longitudinal members 5 of the lower frame 100 without fixing the reinforcement members 4 to the longitudinal members 5 of the lower frame 100. Therefore, in the present embodiment, screw holes (not shown) are provided in the longitudinal members 5 of the lower frame 100 and screws inserted into holes (not shown) provided in the transformer base 3 are threadedly engaged with the screw holes in the longitudinal members 5, thereby fixing the transformer base 3 on which the transformer 2 is mounted to the longitudinal members 5.

Figure 12:
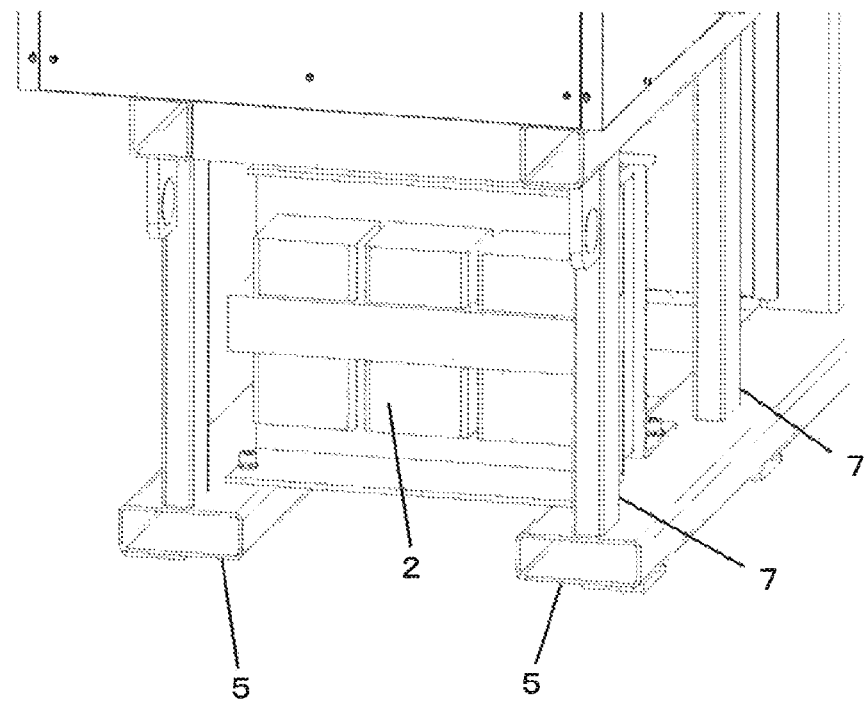
FIG. 12 is a diagram showing a fifth embodiment of the injection molding machine according to the present invention.

Next, a fifth embodiment of the injection molding machine according to the present invention will be described with reference to FIG. 12.

In the fourth embodiment described above, the transformer base 3 on which the transformer 2 is mounted is fixed directly to the longitudinal members 5 of the lower frame 100. In the fifth embodiment, the transformer 2 is fixed directly to the longitudinal members 5 of the lower frame 100 (without being put on the transformer base 3). Therefore, in the fifth embodiment, screw holes (not shown) are provided in the longitudinal members 5 of the lower frame 100 and screws inserted into holes (not shown) provided in the bottom of the transformer 2 are threadedly engaged with the screw holes in the longitudinal members 5, thereby fixing the transformer 2 to the longitudinal members 5.

What is claimed is:

1. An injection molding machine, comprising:
   a machine base;
   an injection unit;
   a mold clamping unit;
   a transformer; and
   a transformer base on which the transformer is mounted, wherein
   the injection unit and the mold clamping unit are placed on the machine base,
   the machine base includes
      an upper frame,
      a lower frame, and
      a plurality of columns supporting the upper frame on the lower frame,
   the lower frame includes
      a plurality of longitudinal members arranged along a longitudinal direction of the injection molding machine,
      a transverse member coupling the longitudinal members together, and
      a reinforcement member,
   the reinforcement member has screw holes engaged with corresponding screws to fix the transformer base to the reinforcement member,
   one end of the reinforcement member in a width direction protrudes from one end of a column among the plurality of columns in the width direction, and
   the transformer is supported by the reinforcement member and placed in the machine base under the mold clamping unit.

2. The injection molding machine according to claim 1, further comprising:
   a plurality of covers covering peripheries of the transformer placed in the machine base.

3. The injection molding machine according to claim 2, wherein the covers support the upper frame.

* * * * *